(12) United States Patent
Notten et al.

(10) Patent No.: US 9,049,813 B2
(45) Date of Patent: Jun. 9, 2015

(54) SAFEGUARDING SEED SAFETY OF TREATED SEEDS

(75) Inventors: Martje J. M. Notten, Kelmond (NL); Bart Geraats, Weert (NL); Rudolf Hendrikus Martinus Nabben, Eindhoven (NL); Jan Van Den Berg, Heythuysen (NL); Wolfram Andersch, Bergisch Gladbach (DE)

(73) Assignee: Bayer Intellectual Property GmbH, Monheim (DE)

( * ) Notice: Subject to any disclaimer, the term of this patent is extended or adjusted under 35 U.S.C. 154(b) by 954 days.

(21) Appl. No.: 12/528,082

(22) PCT Filed: Feb. 26, 2008

(86) PCT No.: PCT/EP2008/001504
§ 371 (c)(1),
(2), (4) Date: Jan. 12, 2010

(87) PCT Pub. No.: WO2008/107097
PCT Pub. Date: Sep. 12, 2008

(65) Prior Publication Data
US 2010/0130365 A1 May 27, 2010

(30) Foreign Application Priority Data
Mar. 6, 2007 (EP) .................................... 07004558

(51) Int. Cl.
*A01N 25/26* (2006.01)
*A01N 43/72* (2006.01)
*A01N 43/48* (2006.01)
*A01N 43/78* (2006.01)
*A01N 43/50* (2006.01)
*A01C 1/00* (2006.01)
*A01C 1/02* (2006.01)
*A01C 1/08* (2006.01)

(52) U.S. Cl.
CPC ... *A01C 1/00* (2013.01); *A01C 1/02* (2013.01); *A01C 1/08* (2013.01)

(58) Field of Classification Search
None
See application file for complete search history.

(56) References Cited

U.S. PATENT DOCUMENTS

| | | | | |
|---|---|---|---|---|
| 4,912,874 | A * | 4/1990 | Taylor ........................ | 47/58.1 R |
| 5,849,320 | A * | 12/1998 | Turnblad et al. ............. | 424/410 |
| 6,001,981 | A | 12/1999 | DeAmicis et al. | |
| 6,156,699 | A | 12/2000 | Johnson et al. | |
| 2002/0129406 | A1* | 9/2002 | Asrar et al. ................... | 800/295 |
| 2002/0177526 | A1 | 11/2002 | Chen et al. | |
| 2006/0150489 | A1 | 7/2006 | Legro et al. | |
| 2008/0153702 | A1* | 6/2008 | Voeste et al. ................. | 504/100 |
| 2008/0234331 | A1* | 9/2008 | Fellmann et al. ............. | 514/341 |

FOREIGN PATENT DOCUMENTS

| | | | |
|---|---|---|---|
| DE | 10 2004 040 719 A1 | | 3/2006 |
| GB | 1465979 | * | 2/1974 |
| GB | 1 465 979 | | 3/1977 |
| GB | 1465979 | * | 3/1978 |
| WO | WO 97/00265 | | 1/1997 |
| WO | WO 2005/077169 A1 | | 8/2005 |
| WO | WO 2005/077170 A1 | | 8/2005 |
| WO | WO 2007/054214 A1 | | 5/2007 |
| WO | WO-2007054214 | * | 5/2007 |
| WO | WO 2008/107097 A1 | | 9/2008 |

OTHER PUBLICATIONS

Dixon, Vegetagle *Brassicas* and Related Crucifers, Crop Production Science in Horticulture, Nov. 2006.*
Benech-Arnold et al. ,Hanbook of Seed Physiologly, Application to Agriculture, Ed., The Haworth Press, Inc., 2004.*
Maude,Seedborne Diseases and Their Control, Principles and Practices, CAB International, published 1996.*
Black et al. , The Encyclopedia of Seeds, CAB International, 2006.*
Draycott et al., The Advantage of Advantage on sugar beet?, British Sugar Beet Review, 74(1), 13-17, 2006.*
Horii et al., Enhancement of seed vigour following insecticide and phenolic elicitor treatment, Biosource Technology 98, 2007, 623-632.*
Gallardo et al., Proteomic Analysis of *Arabidopsis* Seed Germination and Priming, Physiol. vol. 126,2001, 835-848.*
International Search Report in International Application No. PCT/EP2008/001504, European Patent Office, Netherlands, mailed Jun. 13, 2008.
Black, M., et al., "Treatments—Brief History," *The Encyclopedia of Seeds; Science, Technology and Uses*, pp. 714-725, CAB International, Wallingford, United Kingdom (2006).
Dixon, G.R., "Seed and Seedling Management," *Vegetable Brassicas and Related Crucifers; Crop Production Science in Horticulture*, pp. 83-87, CAB International, Wallingford, United Kingdom (2006).
Halmer, P., "Methods to Improve Seed Performance in the Field," *Handbook of Seed Physiology*, pp. 129-140, The Haworth Press, Inc., New York, United States (2004).
Maude, R.B., "Disease Control: Eradication and Reduction of Inoculum by Seed Treatment," *Seedborne Diseases and Their Control Principles and Practice*, pp. 114-178, CAB International, Wallingford, United Kingdom (1996).
Extract from the Register of European Patents for European Patent Application No. EP1947947, Bayer CropScience AG, accessed on May 27, 2013.
Communication of a notice of opposition in European Patent Application No. EP08716044.6, Bayer CropScience AG, dated Jun. 19, 2013.
Certified copy of priority document EP 07004558.8, filed Mar. 6, 2007, for International application No. PCT/EP2008/001504, filed Feb. 26, 2008.

(Continued)

*Primary Examiner* — Alton Pryor
(74) *Attorney, Agent, or Firm* — Sterne, Kessler, Goldstein & Fox P.L.L.C.

(57) ABSTRACT

The present invention relates to a method to overcome negative effects of the treatment of seeds with insecticides, acaricides or nematicides on the germination of seeds and vitality of seedlings. The inventive method markedly enhances germination and vitality of seeds that are treated with insecticides, acaricides or nematicides. The present invention describes a method that at least comprises the following steps: 1) Hydration of the seed 2) Followed by drying of the seed 3) Followed by a treatment of the seed with insecticidal, acaricidal, or nematicidal compounds.

4 Claims, No Drawings

(56) References Cited

OTHER PUBLICATIONS

Altmann, R., "Poncho®: a new insecticidal seed treatment for the control of major maize pests in Europe," *Pflanzenschutz-Nachrichten Bayer* 56(1):102-110 (2003).
Black et al., The Encyclopedia of Seeds; Science, Technology and Uses, p. 243 (2006).
Crouse, G.D. et al., "Recent advances in the chemistry of spinosyns," *Pest Management Science* 57:177-185 (2001).
Draycott, A.P., "The advantage of Advantage on sugar beet?" *British Sugar Beet Review* 74(1):13-17 (2006).
Halmer, P., "Methods to Improve Seed Performance in the Field," Handbook of Seed Physiology, p. 128-129 (2004).
Hamler, P., "Seed technology and its biological basis," *Commercial Seed Treatment Technology*, pp. 276-277 (2000).
Hewett et al., "Biology of Seed Treatment," *Seed Treatment*, pp. 10-13 (1986).
Jeffs et al., "Application of Pesticides to Seeds, Part 1: Requirements for efficient treatment of seeds," *Seed Treatment*, pp. 18-19 (1986).
Jonitz et al., "Seed testing and the effect of insecticidal active ingredients on the germination and emergence of hybrid maize seed," *Pflanzenschutz-Nachrichten Bayer* 56(1):173-207 (2003).
McDonald, M.B., "Seed Priming," *Seed Technology and its Biological Basis*, p. 287 (2000).

* cited by examiner

SAFEGUARDING SEED SAFETY OF TREATED SEEDS

The present invention relates to a method to overcome negative effects of the treatment of seeds with insecticides, acaricides or nematicides on the germination of seeds and vitality of seedlings. The inventive method markedly enhances germination and vitality of seeds that are treated with insecticides, acaricides or nematicides.

The present invention describes a method that at least comprises the following steps:
1) Hydration of the seed
2) Followed by drying of the seed
3) Followed by a treatment of the seed with insecticidal, acaricidal, or nematicidal compounds

BACKGROUND OF THE INVENTION

Insecticides, acaricides and nematicides are widely used to prevent or at least decrease damage of unwanted organisms to crops. These chemicals can be applied on the soil before sowing, and/or before and/or after the seedlings have emerged. Insecticides, acaricides and nematicides can also be added to the seed as a seed treatment. A seed treatment including an insecticidal, nematicidal or acaricidal active ingredient can include one of these types of compounds only, but can also include a mixture of two or more of the same type of compounds. In addition, the insecticidal, nematicidal and acaricidal active ingredient, or the mixtures thereof, could be used in a mixture with at least one other insecticide, acaricide or nematicide. One or more fungicidal compounds could be mixed with the above mentioned (mixtures of) insecticides, acaricides or nematicides as well. In this document, references to insecticidal seed treatments also relate to seed treatments including a nematicidal or acaricidal active ingredients, as well as to seed treatments including the said mixtures of compounds.

The use of seed treatments is a growing market (Halmer, P. 2004. Methods to improve seed performance in the field. In: Handbook of seed physiology. Applications to agriculture. Eds: Benech-Arnold, R. L. and Sánchez, R. A.), because the use of seed treatments has several advantages over the use of spray or granule applications (e.g. Altmann, R. 2003. Pflanzenschutz-Nachrichten Bayer 56(1), pp 102-110; Hewett, P. D. and Griffiths, D. C. 1986. Biology of seed treatment. In: Seed treatment. Ed: Jeffs, K. A.). Seed treatments protect the seed from sowing onwards. Good overall protection in the early growth phase results in healthy and vigorous plants that better tolerate stress situations. In addition, the total amount of product needed is lower than with spray or granule applications. Crop protection by means of seed treatments also includes many advantages for farmers. The need for other insecticide applications is smaller and the farmers do not need to calculate and prepare tank mixings. Both aspects result in time saving. The moment of spraying crop protection chemicals is very weather dependent, but this problem is not an issue for treated seeds.

Agrochemical companies develop formulations especially suitable for the application as a seed treatment. Such formulations can be added to the seed in the form of a film coating. Characteristically, a film coating is a uniform, dust-free, water permeable film, evenly covering the surface of all individual seeds (Halmer, P. 2000. Commercial seed treatment technology. In: Seed technology and its biological basis. Eds: Black, M. and Bewley, J. D.). Besides the formulation, the coating mixture generally also contains other ingredients such as water, glue (typically a polymer), filler materials, pigments and certain additives to improve particular properties of the coating. Several coatings can be combined on a single seed. In this document, 'seed treatment' refers to the application of a film coating on seeds including a formulation with at least one insecticidal, acaricidal or nematicidal active ingredient, including also the possibility of using the coating in or on a pellet, as well as including the insecticidal, nematicidal or acaricidal seed treatment formulation directly into the pellet mixture.

Seed pelleting is a technique that is primarily intended to change the natural shape and size of the raw seed, and the technique can be combined with film coating (Halmer, P. 2000. Commercial seed treatment technology. In: Seed technology and its biological basis. Eds: Black, M. and Bewley, J. D.). Pelleting creates round or rounded shapes, which are easily sown with modern sowing machines. A pelleting mixture contains at least glue and filler material. The latter could be, for example, clay, mica, chalk or cellulose. In addition, certain additives can be included to improve particular properties of the pellet. A seed treatment formulation comprising at least one insecticidal, acaricidal or nematicidal compound can be added directly into the pelleting mixture. In addition, several combinations with film coating are possible: the film coating can be added on the outside of the pellet, in between two layers of pelleting material, and directly on the seed before the pelleting material is added. Also more than 1 film coating layer can be incorporated in a single pellet. A special type of pelleting is encrusting. This technique uses less filler material, and the result is a 'mini-pellet'.

A variety of techniques and machines exist to apply film coatings, and many of these can also be used or adapted for seed pelleting. Manufacturers of seed treatment machines are, for example, Gustafson Equipment, Satec and SUET. Techniques and machines vary in the method of applying the seed treatment mixture to the seed and the blending process (Jeffs, K. A. and Tuppen, R. J. 1986. Applications of pesticides to seeds. Part 1: Requirements for efficient treatment of seeds. In: Seed treatment. Ed: Jeffs, K. A.). The mixture, for example, can be added by means of a spinning disc atomizer or spreading brushes. The seeds and the mixture can be blended by means of an auger, in a drum, or in rotating troughs. If the amount of film coating mixture added is low, and can be absorbed by the seed itself with only a slight (typically less than 1%) increase in seed moisture content, no additional drying step is necessary. This principle is called self-drying (Black et al., 2006. The encyclopedia of seeds. Science, technology and uses). Otherwise, a drying powder (such as talc) could be added, or an additional drying step is necessary. This step could be integrated in the equipment for film coating, such as in the SUET rotary seed treater with integrated fluid bed dryers. Some SATEC batch coaters are equipped to be connected with drying air also.

A disadvantage of the use of crop protection chemicals is the fact that they can negatively affect crop plants themselves, and this also holds for seeds when the chemicals are added as a seed treatment (Halmer, P. 2000. Commercial seed treatment technology. In: Seed technology and its biological basis. Eds: Black, M. and Bewley, J. D.; Halmer, P. 2004. Methods to improve seed performance in the field. In: Handbook of seed physiology. Applications to agriculture. Eds: Benech-Arnold, R. L. and Sanchez, R. A.). Seed safety is thus affected. The seed treatment including at least one insecticidal, acaricidal or nematicidal active ingredient might result in a slower and less uniform germination of the treated seeds. Basically, germination is defined as the moment at which the radicle protrudes the seed coat or the pericarp. In case seeds are sown in substrate fully covering the seeds, germination is defined as the moment at which the seedlings emerge from the substrate (i.e. emergence). Than, a slower germination results in a slower emergence of the seedlings. Throughout the text, the definition of germination of seed stated above is followed, and used interchangeably with the emergence of seedlings, unless stated otherwise. The seed treatment could also influence the maximum germination and the vitality of the seedlings. Vital seedlings are healthy seedlings that can develop in normal yield-producing plants. The seed treatment could result in a lower vitality and even in a higher number of abnormal seedlings or dead seeds. Negative effects of the seed treatment on germination and vitality can be assessed in experiments under controlled conditions in the climate chamber, greenhouse or germination cabinet in the laboratory, as well as in the field.

If negative effects of seed treatments on seed safety occur, these are generally accepted because the benefits of the seed treatment outweigh the costs, but after all they are disadvantageous in modern farming systems. A delay in germination increases the risk (and duration) of the seeds being attacked by disease-causing organisms or soil pests (Jonitz, A and Leist, N. 2003. Pflanzenschutz-Nachrichten Bayer, 56(1), pp 173-207). A slower and less uniform germination could also affect subsequent spraying treatments. Many herbicides, for example, are most effective at a specific developmental stage of the seedlings. Principally, delayed germination also shortens the growing period of the crop which might lead to reduced yields. Finally, if the vitality of the seedlings is affected, this could result in a decrease of number of marketable plants, which could result in yield loss as well.

The invention includes a method to improve the germination of seeds and the vitality of seedlings of agricultural, vegetable or flower seeds treated with a seed treatment including at least one insecticidal, acaricidal or nematicidal active ingredient.

DESCRIPTION OF THE INVENTION

The invention can also be used to enhance the activity of insecticides, acaricides, and nematicides.

Seed treatments including at least one insecticidal, nematicidal or acaricidal active ingredient thus can affect germination of seeds and vitality of seedlings. Surprisingly, we have found that hydrating the seeds followed by drying prior to the application of the said seed treatments reduces or even removes the negative effects of these seed treatments on germination and vitality. The seeds that are hydrated and dried before coating with the said chemical seed treatments benefit of the hydration and drying treatment, as well as of the protection of the chemical seed treatment. In contrast to the general feeling that multiple treatments could harm the seeds, the combination of both treatments even shows a synergistic effect on seed performance. The negative effects of the seed treatment in the hydrated and dried situation are smaller or absent than in the non-hydrated and dried situation.

The invention is applicable to seeds of the crops outlined below. Also included in these lists of crops are hybrids of the said species as well as genetically modified plants of the said species The invention can be used successfully on any seed to which a conventional priming process can be applied.

Specifically, the invention is applicable to seeds of the genera of the following agricultural crops: *Arachis, Avena, Brassica, Carthamus, Glycine, Gossypium, Helianthus, Hordeum, Lolium, Medicago, Oryza, Poa, Secale, Sorghum, Trifolium, Triticum* and *Zea*. Also included is Triticale. Particularly preferred genera of agricultural crops are: *Brassica, Gossypium, Helianthus, Oryza* and *Zea*. The most preferred genera of agricultural crops are: *Brassica, Gossypium,* and *Zea*.

Further, the invention can specifically be applied to the genus of Beta. For sugarbeets (*Beta vulgaris*) it has been demonstrated that a particular priming process under the trade name "Advantage" is compatible with treatments with imidacloprid or tefluthrin (British Sugar Beet Review, Draycott, A. P. 2006. The advantage of Advantage on sugarbeet? In: British Sugar Beet Review, 74 (1), pp 13-17).

Beta is a most preferred genus to work the invention on as well.

For the vegetable crops, the invention is specifically applicable to seeds of: *Allium, Apium, Asparagus, Brassica, Capsicum, Cicer, Cichorium, Citrillus, Cucumis, Cucurbita, Cynara, Daucus, Lactuca, Lens, Phaseolus, Pisum, Raphanus, Solanum* (including tomato, also frequently indicated as *Lycopersicon esculentum*), *Spinacia, Valerianella* and *Vicia*. For the vegetable crops, particularly preferred genera are: *Allium, Brassica, Capsicum, Citrillus, Cucumis, Cucurbita, Daucus, Lactuca* and *Solanum*. Most preferred genera of vegetable crops are: *Allium, Capsicum, Cucumis, Daucus, Lactuca* and *Solanum*. Further most preferred genera of vegetable crops are: *Allium, Brassica, Daucus, Lactuca* and *Solanum*.

Specifically, the invention is applicable to seeds of the genera of the following flower crops: *Antirrhinum, Begonia, Chrysanthemum, Cyclamen, Dianthus, Gazania, Gerbera, Impatiens, Ipomoea, Lavatera, Lobelia, Pelargonium, Petunia, Phlox, Primula, Salvia, Tageta, Verbena, Vinca, Viola* and *Zinnia*. Particularly preferred flower crops are: *Cyclamen, Dianthus, Impatiens, Pelargonium, Petunia, Primula, Tageta, Verbena* and *Viola*. The most preferred flower crops are: *Dianthus, Impatiens, Pelargonium, Petunia, Tageta* and *Verbena*.

'Hydrating' the seed includes all techniques that make seeds absorb water; from soaking in abundant water for a short time period to controllably adding a specific amount of water for several weeks. Seed hydration techniques thus also include those techniques generally included in the concept of priming. Seed priming is defined as the uptake of water by seeds to initiate the early events of germination but not sufficient to permit radicle protrusion, followed by drying (McDonald, M. B. 2000. Seed priming. In: Seed technology and its biological basis. Eds: Black, M. and Bewley, J. D.). 'Water' in this document could be all kinds of water including tap water, rainwater and distilled water. Water in the form of water vapour is also included. Important factors influencing the outcome of a hydration procedure are duration, temperature and the matric or osmotic potential of the priming medium. In addition, light or darkness and the amount of oxidation also influence the outcome of the hydration method.

During the hydration stage, water is taken up by the seed causing enzyme systems and other cellular components to be stimulated and created (McDonald, M. B. 2000. Seed priming. In: Seed technology and its biological basis. Eds: Black, M. and Bewley, J. D.). In this way the seeds have already fulfilled parts of the first phases of germination, resulting in a faster germination upon rewetting. In addition, the hydration treatment results in a more uniform germination because all seeds are at the same stage of development. The addition of promotive substances during priming, and thus generally during hydration, can further enhance seed performance, such as fungicides, biological control organisms and plant growth regulators. Fungicides can be added during the priming procedure in order to prevent excessive growth of fungi at favourable conditions in the priming medium.

Several techniques for seed priming are currently known, namely hydropriming (including drum priming), osmopriming and solid matrix priming (McDonald, M. B. 2000. Seed priming. In: Seed technology and its biological basis. Eds: Black, M. and Bewley, J. D.; Black et al., 2006. The encyclopedia of seeds. Science, technology and uses). Priming is also sometimes referred to as seed conditioning.

Hydropriming includes those techniques in which seeds are allowed to take up water for a short period or at low temperatures, mostly at ample water supply. These techniques are sometimes also referred to as soaking or steeping. The short duration or low temperature ensures that no germination takes place. Durations of the hydropriming procedure range between 0.5 and 60 hours, at temperatures between 5-50° C. Preferred durations are between 1 and 24 hours at temperatures between 10 and 30° C. Alternatively preferred durations are between 1 and 48 hours. Particularly preferred durations for hydropriming are between 4 and 16 hours at temperatures of 15 to 25° C. Alternatively, particularly preferred ranges for hydropriming are durations between 4 and 32 hours, and temperatures between 15 to 20° C.

Hydropriming also includes those techniques that involve the continuous or staged addition of a limited amount of water. A sophisticated form of this concept is drum priming. Seeds are kept in a rotating drum, in which a limited amount of water (or water vapour) is slowly added to the seeds. The limited amount of water controls the extent of priming. Generally, the duration of a drum priming procedure ranges from 1 to 21 days, at temperatures between 5 and 30° C. Preferred durations range between 5 and 17 days, at temperatures between 10 and 30° C. Particularly preferred durations for drum priming are between 7 and 14 days, at a temperatures range of 15-25° C.

With osmopriming, the seeds are exposed to an osmotic solution. This could be carried out, for example, on a blotter, or in a container or (aerated) column. Polyethyleneglycol (PEG) is often used as osmoticum. Other types of osmotica are inorganic salts such as $KH_2PO_4$, $KH(PO_4)_2$, $K_3PO_4$, $KCL$, $KNO_3$ and $Ca(NO_3)_2$ (sometimes these techniques are referred to as saltpriming or halopriming), or mannitol. Due to its low water potential, the osmoticum controls the uptake of water in the seed. Generally, durations of the osmopriming procedure range from 1 to 21 days, at temperatures between 5 and 30° C. and with osmotic potentials between −0.4 and −3.6 MPa. Preferably, osmopriming durations are between 3 and 15 days at temperatures of 10-30° C. and at osmotic potentials of between −0.5 and −2.6 MPa. Alternative preferred durations are between 2 and 15 days exposure. Particularly preferred durations for osmopriming are between 7 and 14 days, at temperatures between 15 and 25° C., and at osmotic potentials of between −1 and −2 MPa. Alternatively, particularly preferred ranges for osmopriming are durations between 0.5 and 14 days, temperatures between 15 and 20° C., and at osmotic potentials between −0.5 and −2.0 Mpa.

With solid matrix priming (SMP), seeds are mixed with water and solid carriers. Examples of solid carriers are vermiculite and diatomaceous silica products. The water is taken up by the seeds as well as absorbed on the solid particle surfaces, which in this way control the water uptake of the seeds. In addition to using particle-like carriers, SMP can be carried out using, amongst others, moist towels, gunny bags, moist sand, sterilised compost or press mud as well. Generally, durations of the SMP procedure range from 1 to 21 days, at temperatures between 5 and 30° C. and with osmotic potentials between −0.4 and −3.6 MPa. Preferably, SMP durations are between 3 and 15 days at temperatures of 10-30° C. and at osmotic potentials of between −0.5 and −2.6 MPa. Particularly preferred durations for SMP are between 7 and 14 days, at temperatures between 15 and 25° C., and at osmotic potentials of between −1 and −2 MPa. Alternatively, particularly preferred ranges for SMP are durations between 8 hours and 7 days, at temperatures between 15 and 20° C., at osmotic potentials between −1 and −2 Mpa.

Although osmotic potentials can be measured and indicated for SMP protocols, giving the ratio of seed:carrier material:water is more common. Many ratios are possible, depending on, for example, seed size, carrier material and the target moisture uptake of the seeds. If the amount (volume or weight) of seed is taken as 1, the amount of carrier material could range, for example, from 0.25 to 3. Then the amount of water could, for example, range from 0.50 to 8. A ratio of seed:carrier:water of 1:2:2.5 is often used. Alternatively, particularly preferred ranges for SMP are durations between 8 hours and 7 days, at temperatures between 15 and 20° C., at a seed:carrier:water ratio of 1:2:2.5.

Other techniques included in the invention are humidification and hardening. These techniques are not always strictly included within the priming definition, but are included in the concept of hydrating and drying seeds. Humidification is a technique in which seeds are exposed to moist air. The used air humidity is generally high, typically between 95 and 100%. The technique is particularly suitable for large seeded species which are highly susceptible to imbibitional damage. Hardening is a technique in which the seeds are exposed to successive hydration and drying cycles (typically 2 to 3), and can also result in germination advancement.

After hydration of the seeds, a drying step is necessary to be able to apply the seed treatment on the seeds successfully and practically. Besides, without drying, the chemical seed treatment might penetrate the seed and be still harmful for the seed and the seedling. Preferably, the seeds are dried to a moisture content between 3 and 15% on a fresh weight basis. Generally, this is the moisture content reached after drying following harvesting. Thus in most cases, the seeds are dried back (redried) to their moisture content before hydration. There are numerous methods known in the art that could be applied for drying, such as drying in still air, in enforced air, in fluidized beds, by means of centrifugation or by sun drying (Black et al., 2006. The encyclopedia of seeds. Science, technology and uses). Many factors influence the seed drying process, such as the surrounding air humidity and temperature, the moisture content of the seed, the plant species involved, and, if applicable, air flow. Techniques including warm air drying are used often in commercial seed drying. Generally, good results will be achieved at air temperatures between 20-50° C. and at relative air humidities between 20-60%. Durations are very method dependent and range from several hours to several days. Seeds could also be dried by means of artificial desiccants (e.g. silica gel or calcium chloride).

Besides the clear advantages, hydrating and drying seeds also has several disadvantages. Obviously, the use of such techniques puts additional costs to the seed, due to the need for specialised equipment and qualified personnel. Similarly, the techniques include an extra time step. In addition, it is known that the shelf life of primed seeds is reduced (McDonald, M. B. 2000. Seed priming. In: Seed technology and its biological basis. Eds: Black, M. and Bewley, J. D.). This poses problems with storage and logistics. Partly due to these reasons, hydrating and drying seeds is not yet generally used in high volume crops such as corn or canola, although it is being applied with sugarbeet. Currently, such techniques are used more extensively in high-value vegetable crops such as leek and carrot, and in some ornamental plants and turf grass species (Black et al., 2006. The encyclopedia of seeds. Science, technology and uses).

Hydrating and drying seeds thus is not a standardised procedure in all crops. There is, however, a need to treat crops with insecticides, and seed treatment insecticides are used increasingly. Our invention offers the possibility to include insecticides, nematicides and acaricides in a seed treatment without decreasing seed quality and emergence. Hydration and drying in combination with a chemical seed treatment safeguards a rapid, typically early, growth which is a prerequisite to exploit a varieties' yield potential to the full. In addition, the invention increases the possibilities for the use of seed treatment insecticides in many crops. This is advantageous because, as explained above, the use of seed treatments has many advantages over the use of spray or granule applications. Due to the invention, the number of species and varieties that can be treated with a chemical seed treatment increases. Before, some varieties could not be treated because they were too sensitive to chemical seed treatments. Besides, our invention offers possibilities for the development of chemicals to be used as seed treatment including at least one insecticidal, nematicidal or acaricidal compound. Certain active ingredients that could not be used as a seed treatment before, due to their negative effect on the seed, can now be included.

The inventive method can be used with the following groups of insecticides, acaricides, and nematicides:
  Group (1) Acetylcholine-receptor-agonists/-antagonists (as e.g. chloronicotinyls/neonicotinoids);
  Group (2) Acetylcholinesterase (AChE) inhibitors (as e.g. carbamates and organophosphates);
  Group (3) Sodium-channel modulators/blockers of voltage gated sodium channels (as e.g. pyrethroids and oxadiazines);
  Group (4) Acetylcholine-receptor modulators (as e.g. spinosyns);
  Group (5) GABA-gated chlorid-channel-antagonists (as e.g. cyclodienes, organochlorines, and fiproles);
  Group (6) Chlorid-channel-activators (as e.g. mectines);
  Group (7) Juvenil-hormone mimics;
  Group (8) Ecdyson-agonists/-disruptors (as e.g. diacylhydrazines);
  Group (9) Inhibitors of chitin biosynthesis (as e.g. benzoylureas);
  Group (10) Inhibitors of oxidative phosphorylation, ATP-disruptors (as e.g. organotins);
  Group (11) Uncoupler of oxidative phosphorylation by disruption of the proton gradient (as e.g. pyrroles and dinitrophenoles);
  Group (12) Site-I electron transport inhibitors (as e.g. METI's);
  Group (13) Site-II electron transport inhibitors;
  Group (14) Site-III electron transport inhibitors;
  Group (15) Microbial disruptors insect gut membrane;
  Group (16) Inhibitors of fatty acid synthesis (as e.g. tetronic acids and tetramic acids);
  Group (17) Carboxamides;
  Group (18) Octopaminergic agonists;
  Group (19) Inhibitors of the magnesium-stimulated ATPase;
  Group (20) Ryanodine receptor activators;
  Group (21) Nereistoxin-analogues;
  Group (22) Biologicals, hormones or pheromones;
  Group (23) Active ingredients with unknown or unspecific mode of action (as e.g. fumigants, selective inhibitors of insect feeding and inhibitors of mite growth).

The active ingredients of groups (1) to (23) are commercially available or listed in
"The Pesticide Manual" (The Pesticide Manual, 13th edition, Editor: CDS Tomlin, British Crop Protection Council, ISBN 1 901396 13 4). Those active ingredients that are neither commercially available nor listed in The Pesticide Manual are identified by their IUPAC or CAS identifier, or their molecular formula.

Group (1) of acetylcholine-receptor-agonists/-antagonists inter alia comprises the following active ingredients:
  (1.1) chloronicotinyls/neonicotinoids (e.g. acetamiprid, clothianidin, dinotefuran, imidacloprid, nitenpyram, nithiazine, thiacloprid, thiamethoxam, imidaclotiz: ((2E)-1-[(2-chloro-1,3-thiazol-5-yl)methyl]-N-nitroimidazolidin-2-imine), AKD 1022: ((2E)-1-[(2-chloro-1,3-thiazol-5-yl)methyl]-3,5-dimethyl-N-nitro-1,3,5-triazinan-2-imine);
  (1.2) nicotine, bensultap, cartap.

Preferred active ingredients of group (1) are:
  (1.1.1) clothianidin
  (1.1.2) imidacloprid
  (1.1.3) thiacloprid
  (1.1.4) thiamethoxam
  (1.1.5) acetamiprid
  (1.1.6) dinotefuran
  (1.1.7) nitenpyram
  (1.1.8) imidaclotiz
  (1.1.9) AKD 1022

Particularly preferred active ingredients of group (1) are:
  (1.1.1) clothianidin
  (1.1.2) imidacloprid
  (1.1.3) thiacloprid
  (1.1.4) thiamethoxam
  (1.1.5) acetamiprid The group (2) of acetylcholinesterase (AChE) inhibitors comprises in particular the following active ingredients:
  (2.1) carbamates (e.g. alanycarb, aldicarb, aldoxycarb, allyxycarb, aminocarb, bendiocarb, benfuracarb, bufencarb, butacarb, butocarboxim, butoxycarboxim, carbaryl, carbofuran, carbosulfan, chloethocarb, dimetilan, ethiofencarb, fenobucarb, fenothiocarb, formetanate, furathiocarb, isoprocarb, metam-sodium, methiocarb, methomyl, metolcarb, oxamyl, phosphocarb, pirimicarb, promecarb, propoxur, thiodicarb, thiofanox, triazamate, trimethacarb, XMC, xylylcarb);
  (2.2) organophosphates (e.g. acephate, azamethiphos, azinphos (-methyl, -ethyl), bromophosethyl, bromfenvinfos (-methyl), butathiofos, cadusafos, carbophenothion, chlorethoxyfos, chlorfenvinphos, chlormephos, chlorpyrifos (-methyl/-ethyl), coumaphos, cyanofenphos, cyanophos, chlorfenvinphos, demeton-S-methyl, demeton-S-methylsulphon, dialifos, diazinon, dichlofenthion, dichlorvos/DDVP, dicrotophos, dimethoate, dimethylvinphos, dioxabenzofos, disulfoton, epn, ethion, ethoprophos, etrimfos, famphur, fenamiphos, fenitrothion, fensulfothion, fenthion, flupyrazofos, fonofos, formothion, fosmethilan, fosthiazate, heptenophos, iodofenphos, iprobenfos, isazofos, isofenphos, isopropyl O-salicylate, isoxathion, malathion, mecarbam, methacrifos, methamidophos, methidathion, mevinphos, monocrotophos, naled, omethoate, oxydemeton-methyl, parathion (-methyl/- ethyl), phenthoate, phorate, phosalone, phosmet, phosphamidon, phosphocarb, phoxim, pirimiphos (-methyl/-ethyl), profenofos, propaphos, propetamphos, prothiofos, prothoate, pyraclofos, pyridaphenthion, pyridathion, quinalphos, sebufos, sulfotep, sulprofos, tebupirimfos, temephos, terbufos, tetrachlorvinphos, thiometon, triazophos, triclorfon, vamidothion).

Preferred acetylcholinesterase (AChE) inhibitors for the inventive method are the following active ingredients of group (2):
(2.1.1) methiocarb
(2.1.2) thiodicarb
(2.1.3) aldicarb
(2.1.4) oxamyl
(2.2.1) ethoprophos
(2.2.2) fenamiphos
(2.2.3) tebupirimfos
(2.2.4) cadusafos
(2.2.5) fosthiazate
(2.2.6) chlorpyrifos-(methyl-/ethyl)

Particularly preferred acetylcholinesterase (AChE) inhibitors for the inventive method are the following active ingredients of group (2):
(2.1.1) methiocarb
(2.1.2) thiodicarb
(2.1.3) aldicarb
(2.2.1) ethoprophos
(2.2.2) fenamiphos The group (3) of sodium-channel modulators/blockers of voltage gated sodium channels comprises the following active ingredients:
(3.1) pyrethroides (e.g. acrinathrin, allethrin (d-cis-trans, d-trans), beta-cyfluthrin, bifenthrin, bioallethrin, bioallethrin-s-cyclopentyl-isomer, bioethanomethrin, biopermethrin, bioresmethrin, chlovaporthrin, cis-cypermethrin, cis-resmethrin, cis-permethrin, clocythrin, cycloprothrin, cyfluthrin, cyhalothrin, cypermethrin (alpha-, beta-, theta-, zeta-), cyphenothrin, DDT, deltamethrin, empenthrin (1R-isomer), esfenvalerate, etofenprox, fenfluthrin, fenpropathrin, fenpyrithrin, fenvalerate, flubrocythrinate, flucythrinate, flufenprox, flumethrin, fluvalinate, fubfenprox, gamma-cyhalothrin, imiprothrin, kadethrin, lambda-cyhalothrin, metofluthrin, permethrin (cis-, trans-), phenothrin (1R-trans isomer), prallethrin, profluthrin, protrifenbute, pyresmethrin, resmethrin, RU 15525, silafluofen, tau-fluvalinate, tefluthrin, terallethrin, tetramethrin (1R-isomer), tralocythrin, tralomethrin, transfluthrin, ZXI 8901, pyrethrins (pyrethrum));
(3.2) oxadiazine (e.g. indoxacarb).

Preferred sodium-channel modulators/blockers of voltage gated sodium channels for the inventive method are the following active ingredients of group (3):
(3.1.1) beta-cyfluthrin
(3.1.2) cyfluthrin
(3.1.3) deltamethrin
(3.1.4) tefluthrin
(3.1.5) bifenthrin
(3.2.1) indoxacarb Particularly sodium-channel modulators/blockers of voltage gated sodium channels for the inventive method are the following active ingredients of group (3):
(3.1.1) beta-cyfluthrin
(3.1.2) cyfluthrin
(3.1.3) deltamethrin
(3.1.4) tefluthrin
(3.2.1) indoxacarb The group (4) of acetylcholine receptor modulators comprises the following active ingredients:
(4.1) spinosyns (e.g. spinosad).

Preferably, the inventive method is utilized with the following preferred active ingredients of group (4) of acetylcholine receptor modulators:
(4.1.1) spinosad
(4.1.2) spinetoram also known as XDE-175, which is the compound known from WO 97/00265 A1, U.S. Pat. No. 6,001,981 and Pest Manag. Sci. 57, 177-185, 2001, it has the formula (I):

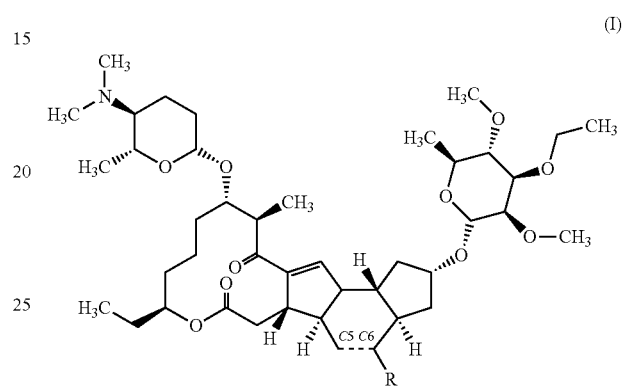

The group (5) of GABA-gated chlorid-channel-antagonists comprises the following active ingredients:
(5.1) cyclodiene organochlorine (e.g. camphechlor, chlordane, gamma-HCH, HCH, heptachlor, lindane, methoxychlor);
(5.2) fiproles (e.g. acetoprole, ethiprole, fipronil, vaniliprole).

Preferably, the inventive method is utilized with the following active ingredients of group (5) of GABA-gated chlorid-channel-antagonists:
(5.2.1) fipronil
(5.2.2) ethiprole Group (6) of the chlorid-channel-activators comprises the following active ingredients:
(6.1) mectines (z.b. abamectin, avermectin, emamectin, emamectin-benzoate, ivermectin, milbemectin, milbemycin)

Preferably, the inventive method is utilized with the following preferred active ingredients of group (6):
(6.1.1) emamectin-benzoate
(6.1.2) avermectin The group (7) of juvenil-hormone mimics comprises the following active ingredients:
(7.1) diofenolan, epofenonane, fenoxycarb, hydroprene, kinoprene, methoprene, pyriproxifen, triprene.

Preferably, the inventive method is utilized with the following preferred active ingredients of group (7):
(7.1.1) pyriproxifen The group (8) of ecdyson-agonists/-disruptors the following active ingredients:
(8.1) diacylhydrazines (e.g. chromafenozide, halofenozide, methoxyfenozide, tebufenozide).

Preferably, the inventive method is utilized with the following preferred active ingredients of group (8):
(8.1.1) methoxyfenozide The group (9) of inhibitors of chitin biosynthesis comprises the following active ingredients:

(9.1) benzoylureas (e.g. bistrifluron, chlofluazuron, diflubenzuron, fluazuron, flucycloxuron, flufenoxuron, hexaflumuron, lufenuron, novaluron, noviflumuron, penfluron, teflubenzuron, triflumuron);

(9.2) buprofezin;

(9.3) cyromazine.

Preferably, the inventive method is utilized with the following preferred active ingredients of group (9):

(9.1.1) triflumuron (9.1.2) flufenoxuron

The group (10) of inhibitors of oxidative phosphorylation, ATP-disruptors (as e.g. organotins) comprises the following active ingredients:

(10.1) diafenthiuron;

(10.2) organotins (e.g. azocyclotin, cyhexatin, fenbutatin-oxide).

The group (11) of uncouplers of oxidative phosphorylation by disruption of the proton gradient comprises the following active ingredients:

(11.1) pyrrole (e.g. chlorfenapyr);

(11.2) dinitrophenole (e.g. binapacyrl, dinobuton, dinocap, DNOC).

The group (12) of site-I electron transport inhibitors comprises the following active ingredients:

(12.1) METI's (e.g. fenazaquin, fenpyroximate, pyrimidifen, pyridaben, tebufenpyrad, tolfenpyrad);

(12.2) hydramethylnone;

(12.3) dicofol.

Preferably, the inventive method is utilized with the following preferred active ingredients of group (12):

(12.1.1) tebufenpyrad (12.2.1) hydramethylnone

The group (13) of Site-H electron transport inhibitors comprises the following active ingredient:

(13.1) rotenone

The group (14) of Site-III electron transport inhibitors comprises the following active ingredients:

(14.1) acequinocyl, fluacrypyrim.

The group (15) of microbial disruptors insect gut membrane comprises the following active ingredient:

(15.1) *Bacillus thuringiensis*-strains

The group (16) of inhibitors of fatty acid synthesis comprises the following active ingredients:

(16.1) tetronic acids (e.g. spirodiclofen, spiromesifen);

(16.2) tetramic acids as for example cis-3-(2,5-dimethylphenyl)-8-methoxy-2-oxo-1-azaspiro[4.5]dec-3-en-4-yl carbonate (spirotetramat, CAS-Reg.-No.: 203313-25-1}).

Preferably, the inventive method is utilized with the following preferred active ingredients of group (16):

(16.1.1) spirodiclofen (16.1.2) spiromesifen (16.2.1) spirotetramat

The group (17) of carboxamides comprises:

(17.1) flonicamid

The group (18) of octopaminergic agonists comprises:

(18.1) amitraz

The group (19) of inhibitors of the magnesium-stimulated ATPase comprises:

(19.1) propargite

The group (20) of ryanodine receptor activators comprises the following active ingredients:

(20.1) $N^2$-[1,1-dimethyl-2-(methylsulfonyl)ethyl]-3-iodo-$N^1$-[2-methyl-4-[1,2,2,2-tetraflour-1(trifluormethyl) ethyl]phenyl]-1,2-benzenedicarboxamide (flubendiamide, CAS-Reg.-No.: 272451-65-7)

(20.2) rynaxypyr of the formula (II)

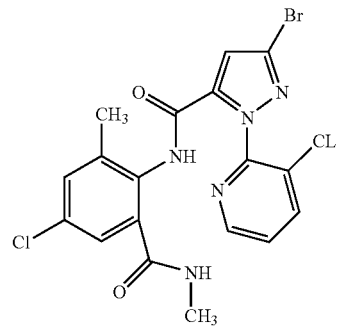

(II)

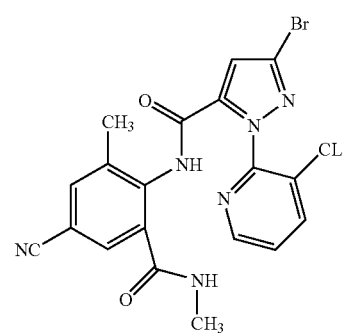

(III)

(20.3) cyazypyr of the formula (III)

The group (21) of nereistoxin analogues comprises the following active ingredients:

(21.1) thiocyclam hydrogen oxalate, thiosultap-sodium.

The group (22) biologicals, hormones or pheromones comprises the following active ingredients:

(22.1) azadirachtin, *Bacillus* spec., *Beauveria* spec., codlemone, *Metarrhizium* spec., *Paecilomyces* spec., *thuringiensin, Verticillium* spec.

The group (23) of active ingredients with unknown or unspecific mode of action comprises the following active ingredients:

(23.1) fumigants (e.g. aluminium phosphide, methyl bromide, sulfuryl fluoride);

(23.2) elective inhibitors of insect feeding (e.g. cryolite, flonicamid, pymetrozine);

(23.3) inhibitors of mite growth (e.g. clofentezine, etoxazole, hexythiazox);

(23.4) amidoflumet, benclothiaz, benzoximate, bifenazate, bromopropylate, buprofezin, chinomethionat, chlordimeform, chlorobenzilate, chloropicrin, clothiazoben, cycloprene, cyflumetofen, dicyclanil, fenoxacrim, fentrifanil, flubenzimine, flufenerim, flutenzin, gossyplure, hydramethylnone, japonilure, metoxadiazone, petroleum, piperonyl butoxide, potassium oleate, pyrafluprole, pyridalyl, pyriprole, sulfluramid, tetradifon, tetrasul, triarathene, verbutin, 3-methyl-phenylpropylcarbamat (tsumacide z), 3-(5-chlor-3-pyridinyl)-7-(2,2,2-trifluorethyl)-7-azabicyclo[3.2.1]octan-3-carbonitril (cas-reg.-nr. 175972-70-3) and the corresponding 3-endo-isomer (cas-reg.-nr. 175974-60-5) (compare WO 96/37494, WO 97/25923), Very particularly preferred active ingredients are:
(1.1.1) clothianidin
(1.1.2) imidacloprid
(1.1.3) thiacloprid
(1.1.4) thiamethoxam
(1.1.5) acetamiprid
(2.1.1) methiocarb
(2.1.2) thiodicarb
(3.1.1) beta-cyfluthrin
(3.1.2) cyfluthrin
(3.1.3) deltamethrin
(3.1.4) tefluthrin
(3.2.1) indoxacarb
(4.1.1) spinosad
(4.1.2) spinetoram
(5.2.1) fipronil
(5.2.2) ethiprole
(6.1.1) emamectin-benzoate
(6.1.2) avermectin
(16.1.1) spirodiclofen
(16.1.2) spiromesifen
(16.2.1) spirotetramat
(20.1) flubendiamide
(20.2) rynaxypyr
(20.3) cyazypyr Most particularly preferred active ingredients are:
(1.1.1) clothianidin
(1.1.2) imidacloprid
(1.1.4) thiamethoxam
(2.1.1) methiocarb
(2.1.2) thiodicarb
(3.1.1) beta-cyfluthrin
(3.1.4) tefluthrin
(4.1.1) spinosad
(4.1.2) spinetoram
(5.2.1) fipronil
(5.2.2) ethiprole
(6.1.1) emamectin-benzoate
(6.1.2) avermectin
(16.2.1) spirotetramat
(20.2) rynaxypyr
(20.3) cyazypyr The preferred, particularly preferred or most particularly preferred features of this invention can be combined in any way to produce embodiments that solve the technical problem underlying this invention.

The negative effects of the seed treatment and the positive effects of hydrating and drying seeds on the germination and vitality of treated seeds can be assessed in several kinds of experiments. Such experiments typically include 4 treatments: control treatment; only seed treatment including at least one insecticidal, nematicidal or acaricidal active ingredient; only hydrated and dried treatment, and a treatment including seeds that are hydrated and dried before the said seed treatment is added ('combination treatment'). Typically, control seeds are defined as raw seeds, which are cleaned and sorted, but which have not been exposed to any type of hydrating and drying treatment as explained earlier. If the chemical seed treatment includes only one or a combination of two or more insecticidal, acaricidal or nematicidal compounds, a fungicide (e.g. Thiram) could be added as a fungicide seed treatment to all the treatments. Negative effects of the seed treatment are defined as a decrease in germination and/or vitality of the 'only' chemical treated seeds in comparison with germination and/or vitality of control seeds. The positive effects of hydration and drying on the germination and vitality of treated seeds are defined as a decrease or absence of negative effects of the seed treatment in the hydrated and dried situation.

The experiments introduced above can be carried out under controlled conditions in, amongst others, the climate chamber, the greenhouse or the germination cabinet in the laboratory, as well as in the field. Under controlled conditions, germinations tests such as described in the ISTA (International Seed Testing Association) handbook as well as tests commonly known in the art as vigour tests can be carried out (ISTA, 2005. International rules for seed testing; AOSA, 1973. Seed vigor testing handbook. Contribution no. 32 to the handbook on seed testing. Association of Official Seed Analysts (AOSA)). Typically, germination tests include tests on or between filter paper or blotter, as well as tests on/in sand, compost or soil. Moisture, temperature and light regimes are optimal for germination (see e.g. ISTA, 2005. International rules for seed testing). Generally, seedlings in a germination test are evaluated when all essential structures are visible. Then, all seedlings are counted that have germinated 'normally' according to e.g. the ISTA guidelines. The number of abnormal, multigerm or dead seeds is recorded as well. Typically, this type of evaluation is carried out at least at two times during the germination process; a first time when all essential structures are visible, and a final count. The time of final count depends on plant species and ambient conditions. Generally, the final count is taken between 5 and 60 days after sowing. Alternatively to the evaluation of seedlings explained above, germination could be assessed in all treatments from the moment any seedling has protruded the seed coat or pericarp in any of the treatments. Subsequently, countings can be performed every other day, once a day or even multiple times a day, depending on the speed of germination. In this way, the whole process of germination can be assessed.

Vigour tests are carried out to assess seed vigour. This is a concept describing those seed properties associated with the potential for a rapid, uniform emergence and development of normal seedlings under a wide range of field conditions. The results of such tests are a better predictor of seed performance in the field than standard germination tests under optimal conditions (ISTA, 2005. International rules for seed testing; AOSA, 1973. Seed vigor testing handbook. Contribution no. 32 to the handbook on seed testing. Association of Official Seed Analysts (AOSA)). Specific vigour tests are stress tests, in which seeds are stressed either prior to imbibition or during germination. In stress tests the substratum could range from sand or an artificial substrate like coconut fibres, to a real arable soil. Besides, or in addition, the climatic conditions are higher or lower than the ones commonly accepted as being optimal. A well known example of a vigour stress test is the cold test which is often carried out on corn seeds. In this test the seeds are sown in arable soil and kept for 7 days at a temperature of 10° C. (cold phase). Thereafter the seeds are kept at 25° C. for another 7 days, after which maximum germination and seedling quality is assessed (Jonitz, A and Leist, N. 2003. Pflantzenschutz-Nachrichten Bayer, 56(1), pp 173-207). Also for vigour tests, germination could be counted at two specific moments, but also at many moments in between in order to construct a view of the whole germination process. For seeds covered with substrate, the counting of emergence in all treatments could start from the moment any emerging seedling is visible above the substrate in any of the treatments involved. Subsequently, emergence could be counted at frequent intervals depending on the progress of emergence. At the final count, the seedlings can be arranged in classes that indicate whether or not the seedling is able to further develop into a satisfactory plant. In this document, these classes are called vitality classes. The seedlings are classified as normal, slightly damaged or abnormal. Seeds that have not germinated or emerged are classified as dead seeds.

Besides the experiments under controlled conditions, tests could also be performed in the field. Due to the, in most cases, less optimal conditions in the field, emergence is counted at a later stage, or from a later stage onwards, than the first count for a certain species under controlled conditions. In addition to a vitality evaluation of the seedlings, yield could be assessed at the end of the growing period of the crop.

Depending on their particular physical and/or chemical properties, the insecticides, acaricides, and nematicides according to the invention can be converted into the customary formulations, such as solutions, emulsions, suspensions, powders, dusts, foams, pastes, soluble powders, granules, aerosols, suspoemulsion concentrates, natural and synthetic materials impregnated with active compound and microencapsulations in polymeric substances and in coating compositions for seeds, and ULV cool and warm fogging formulations.

These formulations are produced in a known manner, for example by mixing the active compounds or active compound combinations with extenders, that is liquid solvents, liquefied gases under pressure, and/or solid carriers, optionally with the use of surfactants, that is emulsifiers and/or dispersants, and/or foam formers.

If the extender used is water, it is also possible to employ, for example, organic solvents as auxiliary solvents. Essentially, suitable liquid solvents are: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example petroleum fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide or dimethyl sulphoxide, or else water.

Liquefied gaseous extenders or carriers are to be understood as meaning liquids which are gaseous at standard temperature and under atmospheric pressure, for example aerosol propellants such as butane, propane, nitrogen and carbon dioxide.

Suitable solid carriers are for example: ammonium salts and ground natural minerals such as kaolins, clays, talc, chalk, quartz, attapulgite, montmorillonite or diatomaceous earth, and ground synthetic minerals such as finely divided silica, alumina and silicates. Suitable solid carriers for granules are: for example crushed and fractionated natural rocks such as calcite, pumice, marble, sepiolite and dolomite, or else synthetic granules of inorganic and organic meals, and granules of organic material such as sawdust, coconut shells, maize cobs and tobacco stalks.

Suitable emulsifiers and/or foam formers are for example: nonionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates, or else protein hydrolysates. Suitable dispersants are: for example lignosulphite waste liquors and methylcellulose.

Tackifiers such as carboxymethylcellulose, natural and synthetic polymers in the form of powders, granules or latices, such as gum arabic, polyvinyl alcohol and polyvinylacetate, or else natural phospholipids such as cephalins and lecithins and synthetic phospholipids can be used in the formulations. Other possible additives are mineral and vegetable oils.

It is possible to use colorants such as inorganic pigments, for example iron oxide, titanium oxide and Prussian Blue, and organic dyestuffs such as alizarin dyestuffs, azo dyestuffs and metal phthalocyanine dyestuffs, and trace nutrients such as salts of iron, manganese, boron, copper, cobalt, molybdenum and zinc.

The active compound content of the use forms prepared from the commercial formulations may be varied within wide ranges. The concentration of active compound of the use forms for controlling animal pests, such as insects and acarids, may be from 0.0000001 to 95% by weight of active compound and is preferably from 0.0001 to 25% by weight. Application is in a manner adapted to the use forms.

Examples

The examples in this section show the positive effect of hydrating and drying the seeds prior to coating the seed with a seed treatment containing at least one insecticidal, nematicidal or acaricidal compound, which has a negative effect on germination and vitality in the non-hydrated situation. Typically, the experiments include four treatments, together showing the effect claimed in the patent: control seeds; seeds coated with the seed treatment only; only hydrating and drying the seeds; hydrating and drying the seeds prior to coating with the specified seed treatment. The tables include data on germination and vitality or related variables. Besides the average data of the specific variable, the tables also include the absolute difference of the averages of the variable between the two treatments relating to the non-hydrated situation and the two treatments relating to the hydrated situation (indicated with 'd' in the column header; eg 'dEmg'). These differences indicate the direction and size of the effect of the seed treatment in the non-hydrated and the hydrated situation. A negative effect of the seed treatment in both situations is indicated with a minus-sign (−), while the absence of the negative effect for a specific variable in the hydrated situation is indicated with a plus-sign (+). The examples show that the negative effect of the seed treatment for a specific variable is smaller or absent in the hydrated and dried situation than in the non-hydrated and dried situation.

Example 1

The effect of hydrating and drying before film coating with the seed treatment insecticide Gaucho (containing the active ingredient imidacloprid) on emergence of tomato (*Lycopersicon esculentum*, variety Tristar) seeds was investigated in the climate room. Seeds were hydrated by means of osmopriming in an aerated solution of polyethyleneglycol (PEG 6000) at an osmotic potential of −1.0 Mpa at a temperature of 20° C. for 7 days. After hydrating, the seeds were dried back to the moisture content prior to hydration. Gaucho WS70 was added with a concentration of 100 or 200 g product per kg seed. The seed treatment formulation was coated on the seed by means of a polymer (polyvinylacetate). Seeds were sown in trays in a mixture of potting soil and river-sand (ratio 1:3). Three replications of 50 seeds per replication were sown. The trays were kept at a light regime of 20 hours light and 4 hours dark, at 23° C. continuously. The data in the table show average percentage of emergence of seedlings at 4 days after sowing (DAS).

| Variety | Dosage | Treatment | Emg (%) | Situation | dEmg (%) |
|---------|--------|-----------|---------|-----------|----------|
| Tristar | 100 g/kg seed | Control | 80.7 | Control | -46.7 |
|  |  | + Gaucho | 34.0 | situation |  |
|  |  | Osmopriming | 96.0 | Osmoprimed | -4.7 |
|  |  | Osmopriming + Gaucho | 91.3 | situation |  |
| Tristar | 200 g/kg seed | Control | 80.7 | Control | -46.7 |
|  |  | + Gaucho | 34.0 | situation |  |
|  |  | Osmopriming | 96.0 | Osmoprimed | -5.3 |
|  |  | Osmopriming + Gaucho | 90.7 | situation |  |

Abbreviations used in table:
Emg = emergence
dEmg = difference in specified variable in specified situation (see introduction to examples)

Example 2

The table shows data on the effect of hydrating and drying prior to film coating with the seed treatment insecticide Cruiser (containing the active ingredient thiamethoxam) on emergence of lettuce (*Lactuca sativa*) seeds, variety Smile (green oakleaf lettuce). Seeds were hydrated by means of osmopriming in an aerated solution of polyethyleneglycol (PEG 6000) at an osmotic potential of -1.5 Mpa at a temperature of 15° C. for 1 day. After hydrating, the seeds were dried back to the moisture content prior to hydration. All seeds were pelleted by means of a clay-based pelleting mixture. The final size of the pellets ranged between 3 and 3.5 mm. Cruiser 70WS was added with a concentration of 115 g product per 100,000 pellets. The seed treatment formulation was coated on the pellets by means of a polymer. Seeds were sown in trays filled with coconut fibres, and topped with vermiculite no. 2. Three replications of 100 seeds per replication were sown. First, the trays were subjected to a cooling period of 7 days at an average temperature of 2° C. Subsequently, the trays were exposed to an alternating temperature of 15 and 10° C., during 6 hours of light and 18 hours of darkness, respectively. The data included in the table show average percentage of emergence of seedlings at 3 days from the end of the 7-day cooling period.

| Variety | Treatment | Emg (%) | Situation | dEmg (%) |
|---------|-----------|---------|-----------|----------|
| Smile | Control | 45.0 | Control | -29.0 |
|  | + Cruiser | 16.0 | situation |  |
|  | Osmopriming | 42.7 | Osmoprimed | -13.4 |
|  | Osmopriming + Cruiser | 29.3 | situation |  |

Abbreviations used in table:
Emg = emergence
dEmg = difference in specified variable in specified situation (see introduction to examples)

Example 3

The effect of hydrating and drying before film coating with the seed treatment insecticide Gaucho (active ingredient imidacloprid) on emergence of white cabbage (*Brassica oleracea* convar. *capitata* var. *alba*) seeds was investigated in the climate room. The experiment was carried out with one variety: Lennox. All seeds were commercially hot-water treated before use. Seeds were hydrated by means of Solid Matrix Priming with a mixture of seed:vermiculite (no. 3):tapwater at a ratio of 1:2:2.5. The mixture was kept in a rotating container. Two exposure times were included: 8 and 24 hours of exposure. The temperature during the priming procedure was kept at 15° C. After hydrating, the seeds were dried back to their initial moisture content. Gaucho WS70 was added with a concentration of 115 or 230 g product per 100,000 seeds. The seed treatment formulation was coated on the seed by means of a polymer. Seeds were sown in trays filled with coconut fibres. Three replications of 50 seeds per replication were sown. The trays were kept at a light regime of 12 hours light and 12 hours dark, at 20 and 15° C., respectively. The table shows average percentage of emergence of seedlings at 5 days after sowing.

| Variety | Exposure time (h) | Dosage | Treatment | Emg (%) | Situation | dEmg (%) |
|---------|-------------------|--------|-----------|---------|-----------|----------|
| Lennox | 8 | 115 g/U | Control | 97.0 | Control | -35.7 |
|  |  |  | + Gaucho | 61.3 | situation |  |
|  |  |  | SMP | 91.3 | SMP | -16.0 |
|  |  |  | SMP + Gaucho | 75.3 | situation |  |
| Lennox | 8 | 230 g/U | Control | 97.0 | Control | -62.3 |
|  |  |  | + Gaucho | 34.7 | situation |  |
|  |  |  | SMP | 91.3 | SMP | -43.3 |
|  |  |  | SMP + Gaucho | 48.0 | situation |  |
| Lennox | 24 | 115 g/U | Control | 97.0 | Control | -35.7 |
|  |  |  | + Gaucho | 61.3 | situation |  |
|  |  |  | SMP | 99.3 | SMP | -4.6 |
|  |  |  | SMP + Gaucho | 94.7 | situation |  |
| Lennox | 24 | 230 g/U | Control | 97.0 | Control | -62.3 |
|  |  |  | + Gaucho | 34.7 | situation |  |
|  |  |  | SMP | 99.3 | SMP | -14.0 |
|  |  |  | SMP + Gaucho | 85.3 | situation |  |

Abbreviations used in table:
U = unit: 100.000 seeds
SMP = Solid Matrix Priming
Emg = emergence
dEmg = difference in specified variable in specified situation (see introduction to examples)

Example 4

Hydrating and drying prior to film coating with the seed treatment insecticide Mundial (containing the active ingredient fipronil) shows a positive effect on the germination of onion (*Allium cepa*; variety Safari) seeds. Seeds were osmoprimed with polyethyleneglycol (PEG 6000) at −2.0 MPa for 7 days at 15° C. Subsequently, seeds were dried back to their initial moisture content. Mundial (FS formulation; 500 g/L) was added at 20 ml product per 100,000 seeds. All seeds were treated with fungicides as well. The following mixture of fungicides was added in the coating mixture: 2.3 g thiram+0.86 g carbendazim per kg seed. The seed treatment was added to the seed by means of a polymer. Seeds were sown in trays filled with coconut fibres. Three replications of 100 seeds per replication were sown. The trays were kept at 18 hours light and 6 hours of darkness, at 30° C. continuously. The data included in the table show the average percentage of emergence of seedlings at 5 days after sowing.

| Variety | Treatment | Emg (%) | Situation | dEmg (%) |
|---|---|---|---|---|
| Safari | Control | 60.7 | Control situation | −14.4 |
|  | + Mundial | 46.3 |  |  |
|  | Osmopriming | 77.3 | Osmoprimed situation | −5.3 |
|  | Osmopriming + Mundial | 72.0 |  |  |

Abbreviations used in table:
Emg = emergence
dEmg = difference in specified variable in specified situation (see introduction to examples)

Example 5

Hydrating and drying before film coating with the seed treatment insecticide Poncho-beta (containing the active ingredients clothianidin and betacyfluthrin) shows positive effects on the germination of carrot (*Daucus carota*) seeds. Seeds were osmoprimed in an aerated solution of polyethyleneglycol (PEG 6000) at between −1.0 and −2.0 MPa for 7-21 days at 15-20° C. Subsequently, seeds were dried back to their moisture content before hydration. Poncho-beta (FS formulation) was added at three concentrations (per 100,000 seeds): 7 g clothianidin+0.9 g betacyfluthrin; 14 g clothianidin+1.8 g betacyfluthrin and 28 g clothianidin+3.6 g betacyfluthrin. All seeds were treated with fungicides as well. The following mixture of fungicides was added in the coating mixture (per kg seed): 1.2 g thiram+4 g iprodione+0.33 g metalaxyl-m. The seed treatment was added to the seed by means of a commercial polymer. A germination test was carried out on blotter moistened with tap water. Three replications of 100 seeds per replication were sown. The germination trays were kept in a germination cabinet at 8 hours light and 16 hours of darkness, at 30 and 20° C., respectively. At day 7 after sowing the seeds were evaluated. All seeds that had germinated normally (at least according to the ISTA guidelines for germination tests) were counted. The table shows the average percentage of normally germinated seeds for the varieties Laguna and Elegance.

| Variety | Dosage | Treatment | $G_n$ (%) | Situation | $dG_n$ (%) |
|---|---|---|---|---|---|
| Laguna | 7 g clothianidin + 0.9 g betacyfluthrin/U | Control | 47.7 | Control situation | −8.7 |
|  |  | + Poncho-beta | 39.0 |  |  |
|  |  | Osmopriming | 74.7 | Osmoprimed situation | −4.0 |
|  |  | Osmopriming + Poncho-beta | 70.7 |  |  |
| Laguna | 14 g clothianidin + 1.8 g betacyfluthrin/U | Control | 47.7 | Control situation | −4.0 |
|  |  | + Poncho-beta | 43.7 |  |  |
|  |  | Osmopriming | 74.7 | Osmoprimed situation | +1.3 |
|  |  | Osmopriming + Poncho-beta | 76.0 |  |  |
| Laguna | 28 g clothianidin + 3.6 g betacyfluthrin/U | Control | 47.7 | Control situation | −8.0 |
|  |  | + Poncho-beta | 39.7 |  |  |
|  |  | Osmopriming | 74.7 | Osmoprimed situation | +5.3 |
|  |  | Osmopriming + Poncho-beta | 80.0 |  |  |
| Elegance | 7 g clothianidin + 0.9 g betacyfluthrin/U | Control | 84.0 | Control situation | −5.3 |
|  |  | + Poncho-beta | 78.7 |  |  |
|  |  | Osmopriming | 94.7 | Osmoprimed situation | −0.7 |
|  |  | Osmopriming + Poncho-beta | 94.0 |  |  |
| Elegance | 14 g clothianidin + 1.8 g betacyfluthrin/U | Control | 84.0 | Control situation | −9.0 |
|  |  | + Poncho-beta | 75.0 |  |  |
|  |  | Osmopriming | 94.7 | Osmoprimed situation | −2.7 |
|  |  | Osmopriming + Poncho-beta | 92.0 |  |  |
| Elegance | 28 g clothianidin + 3.6 g betacyfluthrin/U | Control | 84.0 | Control situation | −11.3 |
|  |  | + Poncho-beta | 72.7 |  |  |
|  |  | Osmopriming | 94.7 | Osmoprimed situation | −4.7 |
|  |  | Osmopriming + Poncho-beta | 90.0 |  |  |

Abbreviations used in table:
U = unit: 100.000 seeds
$G_n$ = normal germination
$dG_n$ = difference in specified variable in specified situation (see introduction to examples)

Example 6

Hydrating and drying prior to film coating with the seed treatment insecticide Poncho-beta (containing a mixture of the active ingredients clothianidin and betacyfluthrin) shows a positive effect on the emergence of carrot (*Daucus carota*) seeds in the field as well (varieties Laguna and Elegance). The hydrating and coating methods were the same as described in the caption of example 5. Only the treatments relating to the mixture of 7 g clothianidin and 0.9 g betacyfluthrin per 100,000 seeds were sown in the field. Three replications of 200 seeds per replication were sown outside in a sandy field soil. Early emergence was counted at 10 days after sowing.

| Variety | Treatment | Emg (%) | Situation | dEmg (%) |
|---|---|---|---|---|
| Laguna | Control | 37.5 | Control | −30.7 |
|  | + Poncho-beta | 6.8 | situation |  |
|  | Osmopriming | 49.8 | Osmoprimed | −17.0 |
|  | Osmopriming + Poncho-beta | 32.8 | situation |  |
| Elegance | Control | 33.7 | Control | −22.9 |
|  | + Poncho-beta | 10.8 | situation |  |
|  | Osmopriming | 36.8 | Osmoprimed | +19.2 |
|  | Osmopriming + Poncho-beta | 56.0 | situation |  |

Abbreviations used in table:
Emg = emergence
dEmg = difference in specified variable in specified situation (see introduction to examples)

Example 7

The effect of hydrating and drying before film coating with the seed treatment insecticide Gaucho (containing the active ingredient imidacloprid) on performance of leek (*Allium ampeloprasum* var. *porrum*; sometimes classified as *Allium porrum* as well) seeds was investigated. The tables include data on the variety Parton. Seeds were hydrated by means of hydropriming at a temperature of 15° C. Two exposure times were investigated: 8 and 32 hours of exposure. The tapwater used for hydropriming was continuously aerated. After hydrating, the seeds were dried back to their moisture content prior to hydration. Gaucho WS70 was added with a concentration of 32 or 64 g product per 100,000 seeds. The seed treatment formulation was coated on the seed by means of a polymer. Seeds were sown in trays filled with coconut fibres. Three replications of 100 seeds per replication were sown. The trays were kept in a climate room at a light regime of 12 hours light and 12 hours dark, at 20 and 15° C., respectively.

TABLE 7a

This table shows data on the average percentage of emergence at 9 DAS (days after sowing), and the average percentage of maximum germination at 18 DAS.

| Variety | Exposure time (h) | Dosage | Treatment | Emg (%) | Gmax (%) | Situation | dEmg (%) | dGmax (%) |
|---|---|---|---|---|---|---|---|---|
| Parton | 8 | 32 g/U | Control | 79.7 | 90.7 | Control | −35.4 | −5.0 |
|  |  |  | + Gaucho | 44.3 | 85.7 | situation |  |  |
|  |  |  | Hydropriming | 80.7 | 89.0 | Hydroprimed | −26.7 | −5.0 |
|  |  |  | Hydropriming + Gaucho | 54.0 | 84.0 | situation |  |  |
| Parton | 8 | 64 g/U | Control | 79.7 | 90.7 | Control | −42.4 | −6.7 |
|  |  |  | + Gaucho | 37.3 | 84.0 | situation |  |  |
|  |  |  | Hydropriming | 80.7 | 89.0 | Hydroprimed | −29.4 | +0.7 |
|  |  |  | Hydropriming + Gaucho | 51.3 | 89.7 | situation |  |  |
| Parton | 32 | 32 g/U | Control | 79.7 | 90.7 | Control | −35.4 | −5.0 |
|  |  |  | + Gaucho | 44.3 | 85.7 | situation |  |  |
|  |  |  | Hydropriming | 84.3 | 92.7 | Hydroprimed | −15.6 | −3.0 |
|  |  |  | Hydropriming + Gaucho | 68.7 | 89.7 | situation |  |  |
| Parton | 32 | 64 g/U | Control | 79.7 | 90.7 | Control | −42.4 | −6.7 |
|  |  |  | + Gaucho | 37.3 | 84.0 | situation |  |  |
|  |  |  | Hydropriming | 84.3 | 92.7 | Hydroprimed | −22.6 | −4.0 |
|  |  |  | Hydropriming + Gaucho | 61.7 | 88.7 | situation |  |  |

Abbreviations used in table:
U = unit: 100.000 seeds
Emg = emergence
Gmax = maximum germination
dEmg/dGmax = difference in specified variable in specified situation (see introduction to examples)

TABLE 7b

This table shows data on the average number of marketable plants at 18 DAS.

| Variety | Exposure time (h) | Dosage | Treatment | Marketable plants (%) | Situation | dMarketable plants (%) |
|---|---|---|---|---|---|---|
| Parton | 8 | 32 g/U | Control | 89.0 | Control | −7.0 |
|  |  |  | + Gaucho | 82.0 | situation |  |

TABLE 7b-continued

This table shows data on the average number of marketable plants at 18 DAS.

| Variety | Exposure time (h) | Dosage | Treatment | Marketable plants (%) | Situation | dMarketable plants (%) |
|---|---|---|---|---|---|---|
| | | | Hydropriming | 87.0 | Hydroprimed | −4.0 |
| | | | Hydropriming + Gaucho | 83.0 | situation | |
| Parton | 8 | 64 g/U | Control | 89.0 | Control | −10.0 |
| | | | + Gaucho | 79.0 | situation | |
| | | | Hydropriming | 87.0 | Hydroprimed | +1.0 |
| | | | Hydropriming + Gaucho | 88.0 | situation | |
| Parton | 32 | 32 g/U | Control | 89.0 | Control | −7.0 |
| | | | + Gaucho | 82.0 | situation | |
| | | | Hydropriming | 90.3 | Hydroprimed | −2.6 |
| | | | Hydropriming + Gaucho | 87.7 | situation | |
| Parton | 32 | 64 g/U | Control | 89.0 | Control | −10.0 |
| | | | + Gaucho | 79.0 | situation | |
| | | | Hydropriming | 90.3 | Hydroprimed | −4.6 |
| | | | Hydropriming + Gaucho | 85.7 | situation | |

The number of marketable plants includes all plants designated to vitality classes A and B. Class A includes all normal seedlings; class B includes slightly damaged and/or small seedlings.

Abbreviations used in table:

U = unit: 100.000 seeds dMarketable plants = difference in specified variable in specified situation (see introduction to examples)

Example 8

This example shows positive effects of hydrating and drying prior to coating of the mixture of the insecticidal compounds clothianidin and betacyfluthrin, and clothianidin and spinosad on the performance of carrot seeds (*Daucus carota*; variety Starca). Seeds were osmoprimed in an aerated solution of polyethyleneglycol (PEG 6000) at between −1.0 and −2.0 MPa for 7-21 days at 15-20° C. Subsequently, seeds were dried back to their moisture content before hydration. Clothianidin was added at a concentration of 7 g per 100,000 seeds in both mixtures. Betacyfluthrin or spinosad were added in the mixture at a concentration of 0.9 or 3.5 g per 100,000 seeds, respectively. The seed treatment formulation was coated on the seed by means of a polymer. All seeds were treated with fungicides as well. The following mixture of fungicides was added in the coating mixture (per kg seed): 1.2 g thiram+4 g iprodione+0.33 g metalaxyl-m. Seeds were sown in trays filled with coconut fibres. Three replications of 100 seeds per replication were sown. The trays were kept in a climate room at a light regime of 12 hours light and 12 hours dark, at 20 and 15° C., respectively.

TABLE 8a

This table shows data on the average percentage of emergence at 7 days after sowing (DAS).

| Variety | Dosage | Treatment | Emg (%) | Situation | dEmg (%) |
|---|---|---|---|---|---|
| Starca | 7 g clothianidin + 0.9 g betacyfluthrin/U | Control | 19.0 | Control | −9.7 |
| | | + Clothianidin & betacyfluthrin | 9.3 | situation | |
| | | Osmopriming | 86.7 | Osmoprimed | +2.3 |
| | | Osmopriming + clothianidin & betacyfluthrin | 89.0 | situation | |
| Starca | 7 g clothianidin + 3.5 g spinosad/U | Control | 19.0 | Control | −9.7 |
| | | + Clothianidin & spinosad | 9.3 | situation | |
| | | Osmopriming | 86.7 | Osmoprimed | +3.0 |
| | | Osmopriming + clothianidin & spinosad | 89.7 | situation | |

Abbreviations used in table:

U = unit: 100.000 seeds

Emg = emergence dEmg = difference in specified variable in specified situation (see introduction to examples)

TABLE 8b

This table shows data on the average percentage of seedlings in vitality class A at 14 DAS.

| Variety | Dosage | Treatment | VitA (%) | Situation | dVitA (%) |
|---|---|---|---|---|---|
| Starca | 7 g clothianidin + 0.9 g betacyfluthrin/U | Control | 66.3 | Control situation | −9.0 |
| | | + Clothianidin & betacyfluthrin | 57.3 | | |
| | | Osmopriming | 71.7 | Osmoprimed situation | +4.3 |
| | | Osmopriming + clothianidin & betacyfluthrin | 76.0 | | |
| Starca | 7 g clothianidin + 3.5 g spinosad/U | Control | 66.3 | Control situation | −4.6 |
| | | + Clothianidin & spinosad | 61.7 | | |
| | | Osmopriming | 71.7 | Osmoprimed situation | +6.3 |
| | | Osmopriming + clothianidin & spinosad | 78.0 | | |

This class includes all seedlings that are normal with respect to size and cotyledons, and are not damaged.
Abbreviations used in table:
U = unit: 100.000 seeds
VitA = vitality class A
dVitA = difference in specified variable in specified situation (see introduction to examples)

Example 9

The effect of hydrating and drying before film coating with the seed treatment insecticide Gaucho (containing the active ingredient imidacloprid) on performance of leek (*Allium ampeloprasum* var. *porrum*; sometimes classified as *Allium porrum* as well) seeds was investigated in the climate room. The experiment was carried out with two varieties: Ashton and Shelton. Seeds were drumprimed at a temperature of between 15 and 22° C. for 7 to 14 days, and finally reached a water content of 70-100% based on dry weight. Subsequently, the seeds were dried back to their initial moisture content. All seeds were treated with the fungicide thiram (1.5 g thiram per kg seeds). Gaucho WS70 was added with a concentration of 140 g product per kg seed. The seed treatment formulation was coated on the seed by means of a polymer. Seeds were sown in trays filled with coconut fibres. Three replications of 50 seeds per replication were sown. The trays were kept at a light regime of 12 hours light and 12 hours dark, at 20 and 15° C., respectively.

The following three treatments were included in the experiment: control; Gaucho film coating; hydrating and drying prior to Gaucho film coating. There was no 'only hydrated and dried' treatment included, but both for emergence and vitality A the results of this treatment can be 100% at maximum. If the experiment is interpreted using this maximum emergence or vitality A; the examples show the patent claims as well.

TABLE 9a

This table shows data on the average percentage of emergence at DAS 8 or 9, depending on the leek variety used.

| Variety | Emg at DAS | Treatment | Emg (%) | Situation | dEmg (%) |
|---|---|---|---|---|---|
| Ashton | 9 | Control | 82.7 | Control situation | −34.0 |
| | | + Gaucho | 48.7 | | |
| | | Drumpriming | Max. 100 | Drumprimed situation | Max. −7.3 |
| | | Drumpriming + Gaucho | 92.7 | | |
| Shelton | 8 | Control | 70.0 | Control situation | −45.3 |
| | | + Gaucho | 24.7 | | |
| | | Drumpriming | Max. 100 | Drumprimed situation | Max. −8.7 |
| | | Drumpriming + Gaucho | 91.3 | | |

Abbreviations used in table:
DAS = days after sowing
Emg = emergence
dEmg = difference in specified variable in specified situation (see introduction to examples)

TABLE 9b

This table shows data on the average percentage of seedlings in vitality class A (VitA).

| Variety | VitA at DAS | Treatment | VitA (%) | Situation | dVitA (%) |
|---|---|---|---|---|---|
| Ashton | 20 | Control | 71.3 | Control situation | −48.0 |
| | | + Gaucho | 23.3 | | |
| | | Drumpriming | Max. 100 | Drumprimed situation | Max. −37.3 |
| | | Drumpriming + Gaucho | 62.7 | | |
| Shelton | 17 | Control | 72.7 | Control situation | −31.4 |
| | | + Gaucho | 41.3 | | |

TABLE 9b-continued

This table shows data on the average percentage
of seedlings in vitality class A (VitA).

| Variety | VitA at DAS | Treatment | VitA (%) | Situation | dVitA (%) |
|---|---|---|---|---|---|
| | | Drumpriming | Max. 100 | Drumprimed | Max. −21.3 |
| | | Drumpriming + Gaucho | 78.7 | situation | |

This class includes all seedlings that are normal with respect to size and cotyledons, and are not damaged. The vitality evaluation was carried out at 17 or 20 DAS depending on the variety. For the interpretation of the negative effects of the seed treatment in the drumprimed situation, it should be noted that it is highly unlikely that all seedlings of the primed controls of both varieties would have been classified as vitality A (thus VitA being 100%). Therefore, the negative effects in the drumprimed situation for both varieties are expected to be smaller than the maximum indicated in the table.
Abbreviations used in table:
DAS = days after sowing
VitA = vitality A class
dVitA = difference in specified variable in specified situation (see introduction to examples)

Example 10

The effect of hydrating and drying prior to film coating with the seed treatment insecticide Elado (containing the active ingredients clothianidin and betacyfluthrin) on performance of oilseed rape (*Brassica napus*; variety Talent) seeds was investigated in the greenhouse. Seeds were osmoprimed in an aerated solution of polyethyleneglycol (PEG 6000) for 20 hours at −1.0 MPa at 15° C. Subsequently, the seeds were dried back to their initial moisture content. Elado FS 480 was added with a concentration of 10 g clothianidin and 2 g betacyfluthrin per kg seed. All seeds were treated with the fungicides thiram and dimethomorph (4 and 5 g per kg seed, respectively) as well. Seeds were sown in trays filled with a sandy loam soil from the field. Three replications of 50 seeds per replication were used. The trays were kept in the greenhouse at a light regime of 12 hours light and 12 hours dark, at 20° C. continuously. The table shows data on the average percentage of emergence at 3 days after sowing.

| Variety | Treatment | Emg (%) | Situation | dEmg (%) |
|---|---|---|---|---|
| Talent | Control | 52.0 | Control | −15.3 |
| | + Elado | 36.7 | situation | |
| | Osmopriming | 76.7 | Osmoprimed | −2.7 |
| | Osmopriming + Elado | 74.0 | situation | |

Abbreviations used in table:
Emg = emergence
dEmg = difference in specified variable in specified situation (see introduction to examples)

Example 11

The effect of hydrating and drying before film coating with the seed treatment insecticide Prosper (containing the insecticidal active ingredient clothianidin and the fungicides thiram, carboxin and metalaxyl) on performance of oilseed rape (*Brassica napus*; variety Talent) seeds was investigated in the climate room. Seeds were osmoprimed in an aerated solution of polyethyleneglycol (PEG 6000) for 20 hours at −1.0 MPa at 15° C. Subsequently, the seeds were dried back to their initial moisture content. Prosper FS 300 was added with a concentration of 150 g clothianidin, 150 g thiram, 70 g carboxin and 5 g metalaxyl per 100 kg seed. The unprimed and primed control seeds were not treated with any fungicides. In this way, the effect of the mixture of insecticides and fungicides in the non-hydrated and hydrated situation, was assessed. Seeds were sown in trays filled with potting soil. Three replications of 50 seeds per replication were used. The trays were kept in the greenhouse at a light regime of 12 hours light and 12 hours dark, at 20 and 15° C., respectively. The table shows data on the average percentage of emergence at 4 days after sowing.

| Variety | Treatment | Emg (%) | Situation | dEmg (%) |
|---|---|---|---|---|
| Talent | Control | 77.0 | Control | −11.7 |
| | + Prosper | 65.3 | situation | |
| | Osmopriming | 78.7 | Osmoprimed | 0.0 |
| | Osmopriming + Prosper | 78.7 | situation | |

Abbreviations used in table:
Emg = emergence
dEmg = difference in specified variable in specified situation (see introduction to examples)

Example 12

The effect of hydrating and drying prior to film coating of the seed treatment insecticide Cruiser (containing the active ingredient thiamethoxam) on performance of corn (*Zea Mays*; variety Agromax) seeds was investigated in the greenhouse. Seeds were osmoprimed in an aerated solution of polyethyleneglycol (PEG 6000) for 48 hours at −0.6 MPa at 15° C. Subsequently, the seeds were dried back to their initial moisture content. Cruiser FS350 was added with a concentration of 1.25 mg active ingredient per kernel. All seeds were treated with the fungicide thiram at 0.62 mg active ingredient per kernel. Seeds were sown in trays filled with a sandy loam soil from the field. Three replications of 25 seeds per replication were used. The trays were kept in the greenhouse at a light regime of 12 hours light and 12 hours dark, at 20° C. continuously. The table shows data on the average percentage of emergence at 3 days after sowing.

| Variety | Treatment | Emg (%) | Situation | dEmg (%) |
|---|---|---|---|---|
| Agromax | Control | 88.0 | Control | −37.3 |
| | + Cruiser | 50.7 | situation | |
| | Osmopriming | 84.0 | Osmoprimed | −22.7 |
| | Osmopriming + Cruiser | 61.3 | situation | |

Abbreviations used in table:
Emg = emergence
dEmg = difference in specified variable in specified situation (see introduction to examples)

The invention claimed is:

1. A method to improve germination of seeds and vitality of seedlings of an agricultural, vegetable or flower crop, comprising (i) hydrating, (ii) drying, and (iii) treating said seeds of the crop with a seed treatment containing at least one insecticidal, acaricidal or nematicidal compound, wherein the seedlings are selected from the group consisting of:

seedlings of Agricultural crops selected from the group consisting of: Beta, *Brassica, Gossypium*, and *Zea*;

seedlings of Vegetable crops selected from the group consisting of: *Allium, Brassica, Capsicum, Cucumis, Daucus, Lactuca*, and *Solanum*; and seedlings of Flower crops selected from the group consisting of: *Dianthus, Impatiens, Pelargonium, Petunia*, Tageta, and *Verbena*, wherein the seeds are hydrated by hydropriming for 1 to 24 hours, at temperatures from 10° C. to 30° C., or drum-primed for 5 to 17 days, at temperatures from 10° C. to 30° C., or osmoprimed for 3 to 15 days, at temperatures from 10° C. to 30° C., with an osmotic potential of −0.5 to −2.6 MPa, or solid matrix primed for 3 to 15 days, at temperatures from 10° C. to 30° C., with an osmotic potential of −0.5 to −2.6 MPa, dried to a moisture content of 3 to 15% on a fresh weight basis, wherein said at least one compound is selected from the group consisting of:
(1.1.1) clothianidin,
(1.1.2) imidacloprid,
(1.1.4) thiamethoxam,
(5.2.1) fipronil
and wherein the negative effect of the seed treatment on germination of seeds and vitality of seedlings is smaller or absent than a treating without (ii) drying prior to the treating.

2. The method according to claim 1, wherein the seedlings are selected from the group consisting of:
Beta, *Brassica, Gossypium*, and *Zea*.

3. The method according to claim 1, wherein the seedlings are selected from the group consisting of: *Allium, Brassica, Capsicum, Cucumis, Daucus, Lactuca*, and *Solanum*.

4. The method according to claim 1, wherein the seedlings are selected from the group consisting of:
*Dianthus, Impatiens, Pelargonium, Petunia, Tageta*, and *Verbena*.

* * * * *